United States Patent
Appalaraju et al.

(10) Patent No.: US 10,089,661 B1
(45) Date of Patent: Oct. 2, 2018

(54) IDENTIFYING SOFTWARE PRODUCTS TO TEST

(71) Applicant: Amazon Technologies, Inc., Seattle, WA (US)

(72) Inventors: Srikar Appalaraju, Bangalore (IN); Vipul Bhargava, Seattle, WA (US); Amol Wanjari, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/380,664

(22) Filed: Dec. 15, 2016

(51) Int. Cl.
G06F 9/44 (2018.01)
G06Q 30/02 (2012.01)
G06F 17/30 (2006.01)

(52) U.S. Cl.
CPC ..... *G06Q 30/0282* (2013.01); *G06F 17/3053* (2013.01)

(58) Field of Classification Search
CPC .............. G06Q 30/0282; G06F 17/3053
USPC .................... 717/120–128, 140–141
See application file for complete search history.

(56) References Cited

U.S. PATENT DOCUMENTS

| | | | | |
|---|---|---|---|---|
| 5,742,745 A * | 4/1998 | Sugikawa | ........... | H04L 12/1813 358/1.15 |
| 7,331,063 B2 * | 2/2008 | Gunyakti | ................ | G06F 21/10 705/57 |
| 7,490,081 B2 * | 2/2009 | Best | ................. | G06F 17/30675 |
| 7,853,609 B2 * | 12/2010 | Dehghan | ................... | G06F 8/65 707/778 |
| 7,873,945 B2 * | 1/2011 | Musuvathi | .......... | G06F 11/3688 717/104 |
| 7,895,565 B1 * | 2/2011 | Hudgons | ............. | G06F 11/3684 717/106 |
| 7,900,201 B1 * | 3/2011 | Qureshi | ................. | G06N 5/048 717/120 |
| 7,996,814 B1 * | 8/2011 | Qureshi | ................. | G06N 5/048 717/100 |

(Continued)

OTHER PUBLICATIONS

Yuan et al, "Substra: A Framework for Automatic Generation of Integration Tests", ACM, pp. 64-70, 2006.*

(Continued)

*Primary Examiner* — Anil Khatri
(74) *Attorney, Agent, or Firm* — Lee & Hayes, PLLC

(57) ABSTRACT

Techniques are disclosed herein for identifying software products, available from an electronic marketplace, to be tested. Data associated with software products is accessed and analyzed to determine what software products to test. The data analyzed may include, but is not limited to, download data, crash data, ratings data, marketplace data, usage data, and the like. A machine learning mechanism may be used to predict a popularity of a software product, classify the application into a category relating to whether a potential anomaly is identified for the software product, and determine whether to test the software product. A score may also be calculated for the software products that indicates whether or not to test the software product. The predicted popularity, the classification and/or the score may be used to determine whether to perform further analysis or testing with regard to a software product. For instance, the score may be used to determine that the software product is to be tested by a testing service.

20 Claims, 9 Drawing Sheets

(56) References Cited

U.S. PATENT DOCUMENTS

| | | | | |
|---|---|---|---|---|
| 8,032,425 B2 * | 10/2011 | Yi | ............ | G06Q 30/02 |
| | | | | 705/26.64 |
| 8,055,603 B2 * | 11/2011 | Angell | ............ | G06N 5/025 |
| | | | | 706/47 |
| 8,229,782 B1 * | 7/2012 | Adams | ............ | G06Q 10/10 |
| | | | | 705/7.32 |
| 8,276,267 B2 * | 10/2012 | Choi | ............ | H05K 13/021 |
| | | | | 29/739 |
| 8,464,289 B2 * | 6/2013 | Pan | ............ | H04N 21/2668 |
| | | | | 725/10 |
| 8,522,209 B2 * | 8/2013 | Wintergerst | ............ | G06F 11/3466 |
| | | | | 717/124 |
| 8,595,338 B2 * | 11/2013 | Ravichandran | ............ | G06Q 10/06 |
| | | | | 709/221 |
| 8,819,632 B2 * | 8/2014 | Williams | ............ | G06Q 10/10 |
| | | | | 714/38.14 |
| 8,832,659 B2 * | 9/2014 | Ceze | ............ | G06F 8/314 |
| | | | | 717/124 |
| 9,015,667 B2 * | 4/2015 | Meijer | ............ | G06F 11/076 |
| | | | | 717/124 |
| 9,058,230 B1 * | 6/2015 | van Rietschote | ............ | G06F 8/61 |
| 9,146,720 B1 * | 9/2015 | McGilliard | ............ | G06F 8/60 |
| 9,665,826 B2 * | 5/2017 | Jain | ............ | G06N 5/022 |

OTHER PUBLICATIONS

Saglietti et al, "Automated Unit and Integration Testing for Component-based Software Systems", ACM, pp. 1-6, 2010.*

Wu, "Diagnose Crashing Faults on Production Software", ACM, pp. 771-774, 2014.*

Seo et al, "Predicting Recurring Crash Stacks", ACM, pp. 180-189-2012.*

Haran et al, "Applying Classification Techniques to RemotelyCollected Program Execution Data", ACM, pp. 146-155, 2005.*

Liu et al, "A Reputation Model for Aggregating Ratings based on Beta Distribution Function", ACM, pp. 1-5, 2017.*

* cited by examiner

IDENTIFYING SOFTWARE PRODUCTS TO TEST

BACKGROUND

Today, many users acquire software products from electronic marketplaces. The catalog for an electronic marketplace from which customers may choose software products may include a large number of software products that typically increase and change on a daily basis. Maintaining high quality standards for the software products can be challenging for providers of such electronic marketplaces.

The significant variation in the software and hardware configuration of smartphone, tablet, and other types of computing devices can make it difficult for developers to create software products that execute properly on a wide range of devices. For example, a developer might test the operation of their software products on a single device that they own. It is, however, usually cost prohibitive for a developer to purchase many physical devices to use for testing. A software product that does not execute properly can be frustrating to both the developer and to the customers that acquire the program from an electronic marketplace.

In an attempt to maintain the quality of the software products offered by an electronic marketplace, software products submitted to the electronic marketplace might be tested for various types of issues. For instance, some or all of the software products may be tested for operational issues. The analysis and testing of these software products, however, may require a significant investment in time and money by the provider of the electronic marketplace.

DETAILED DESCRIPTION

Figure 1:
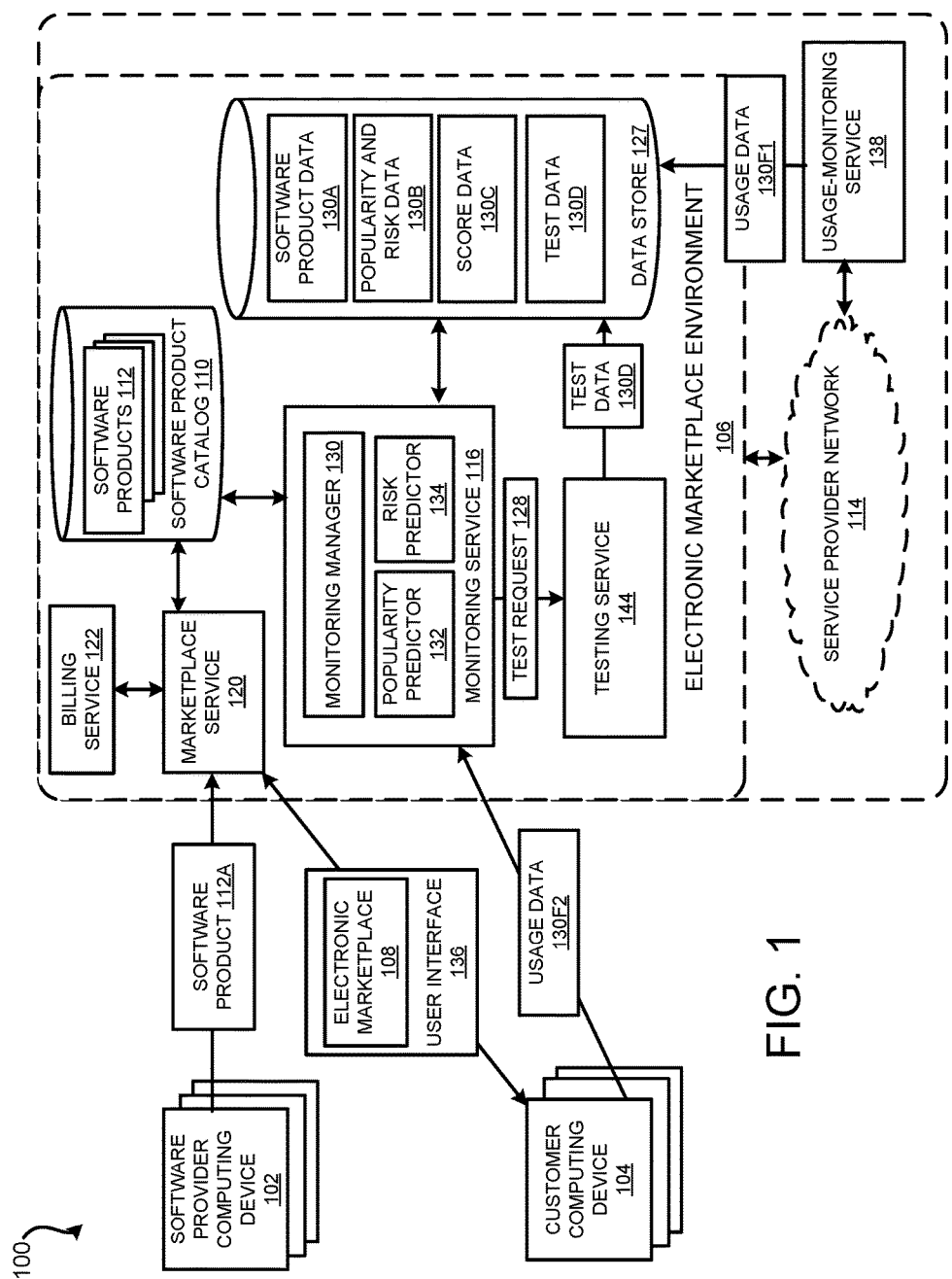
FIG. 1 is a block diagram depicting an illustrative operating environment in which data associated with software products of an electronic marketplace are programmatically analyzed to identify software products to test.

The following detailed description is directed to technologies for identifying software products to test. Using technologies described herein, software products that are available from an electronic marketplace can be identified for testing using a predicted popularity of the software product. Instead of wasting valuable resources by testing software products that are not likely to become popular, software products that are likely to become popular within the electronic marketplace are identified for testing. In this way, the software products tested are more likely to affect a larger number of customers of the electronic marketplace. A software product can include any software and/or software services, for example, an application (or "app" on a mobile device), a machine image, or software provided as a service ("SaaS"). In some configurations, the software product is available from an electronic marketplace and can be downloaded by a customer and executed on a computing device. The software product might also be executed within a service provider network or some other type of distributed computing environment.

Different mechanisms and techniques can be used to identify the software products to test. In some configurations, a popularity predictor generates a predicted popularity of the software product within the electronic marketplace. In some configurations, the popularity predictor forecasts the number of times a software product will be downloaded in the future based on the number of times the software product is downloaded within a specified time period (e.g., the last day, two days, week). The popularity predictor uses this predicted value of downloads in predicting the popularity of the software product.

In addition to using the number of times the software product has been downloaded (if available), and the predicted number of downloads, the popularity predictor can use other data when predicting the popularity of a software product. For example, the popularity predictor can use download data available from other electronic marketplaces where the software product has also been released. The popularity forecaster can utilize data indicating how long the software product has been available (the "age" of the software product), the revenue generated by the software product, the number of ratings associated with the software product, as well as other types of data discussed in more detail below.

In addition to forecasting a popularity of the software product, software products that are exhibiting anomalous behavior can be identified. Anomalous behavior can include any identified or detected behavior associated with a software product that is not standard, normal, or expected, for example crashing or exhibiting an error. The anomalous behavior can relate to functional issues such as but not limited to installation issues, usability issues (e.g., crashes, unresponsiveness), functionality issues, purchase issues for purchases attempted from within the software product, not behaving as intended, and the like. In some configurations, software products that violate content policy issues can also be identified. Some of these content policy issues can include but are not limited to, content without an appropriate rating, banned content, cultural intolerance and terrorism, international and country specific policy, illegal content such as gambling, or drugs, violation of Intellectual properties, and the like.

According to some techniques, a machine learning mechanism, a scoring mechanism, a classification mechanism, or some other type of mechanism might be utilized to identify software products to test that are available from an electronic marketplace. The mechanisms can be used to predict the popularity of the software products, determine which software products may be exhibiting anomalous behavior, which software products have content policy issues, and identify which software products to test. For example, a popularity model can predict a future popularity of a software product. In some configurations, a monitoring service accesses and analyzes data associated with a software product after the software product is already available to customers of an electronic marketplace.

The data accessed and analyzed to identify the software products to test might include, but is not limited to, download data, crash data, ratings data, marketplace data, usage data, and the like. The download data might include data that indicates the number of downloads of the software product from the electronic marketplace or other electronic marketplaces. The crash data might be data that is obtained from a crash of the software product (e.g., crashed on a customer computing device or within a service provider network). The ratings data might include positive or negative reviews of a software product or software provider. The usage data may include data related to a use of the software product. For example, the usage data might include data indicating how the software product is being utilized on a customer computing device or within a service provider network, session lengths relating to the use of the software product, the number of daily active users, the number of installs per customer, and the like. The marketplace data might include data such as revenue data for the software product, number of downloads of the software product, and the like. Generally, any data that provides an indication of a current state of the software product may be accessed and utilized to determine whether to test the software product.

After accessing the data, the data is programmatically analyzed to predict a popularity of the software product and to detect behavior associated with the software product that may be considered anomalous behavior. As mentioned above, one or more machine learning mechanisms can utilize the accessed data to identify whether a software product available from an electronic marketplace is exhibiting anomalous behavior. The mechanisms can also include a prediction model that predicts a popularity of software products and a risk model that identifies software products that are likely to exhibit anomalous behavior and/or violate one or more content policies.

The outputs of these different models can be combined to identify and prioritize software products to test. For example, the software products to test can be based on the predicted popularity and the likelihood that the software product exhibits or is likely to have issues with anomalous behavior and/or content. Other models can be used to further refine the selection of software products to test.

According to some examples, the monitoring service may classify the software products into different categories that provide an indication of anomalous behavior. For example, the software products may be classified into a non-anomalous behavior category (e.g., a good software product) and an anomalous behavior category (e.g., a bad software product). In some configurations, more classification categories may be utilized when classifying the software products.

In some configuration, the monitoring service may determine a severity of the anomalous behavior. For instance, the monitoring service may generate scores for software products that indicates the severity of the identified anomalous behavior. In some examples, the monitoring service utilizes a statistical mechanism to generate the scores. According to some configurations, the scores may be sorted (e.g., in increasing or decreasing order) in order to determine the software products that are detected as exhibiting the most severe (or least severe) anomalous behavior.

The predicted popularity, classification and/or the score might be used to determine what software products available from an electronic marketplace are to be tested or further analyzed. For instance, a monitoring service may cause one or more of the software products forecasted to be popular and exhibiting (or possibly exhibiting) anomalous behavior to be submitted to a testing service for automated and/or manual testing. In some configurations, the monitoring service determines the software products to test based on the available resources of the testing service. In these cases, one or more scores might be used to prioritize the testing of the software products.

In some examples, results of the prediction of popularity, risk of the software product exhibiting anomalous behavior, as well as ranking, classification and/or scoring of the software products may be provided to an authorized user. For instance, a listing of the software products identified to be tested can be displayed within a graphical user interface ("GUI"), or provided in some other manner.

In some configurations, the results associated with identifying the software products to test may be used to further refine the machine learning mechanism. For example, the results from the predicted popularity and risk of the software the product can be used along with the actual popularity of the software product and data indicating anomalous behavior of the software products can be used to update a model used by the machine learning mechanism. In some configurations, an authorized user might also use the results to adjust the weight of different parameters used to determine the software products to test (e.g., a crashes might be weighted more heavily as compared to a number of times the software product is launched). Additional details regarding the various components and processes described above relating to identifying software products to test will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which data associated with software products of an electronic marketplace are programmatically analyzed to identify software products to test. As illustrated in FIG. 1, the operating environment 100 includes one or more software provider computing devices 102 and one or more customer computing devices 104 in communication with an electronic marketplace environment 106. The electronic marketplace environment 106 may provide an electronic marketplace 108. In some examples, the electronic marketplace environment 106 may be associated with and/or implemented by resources provided by a service provider network 114.

A software provider, using a software provider-computing device 102, may submit one or more software products 112 to the electronic marketplace 108 for inclusion in an online software product catalog 110. For example, the software products 112 might be applications that are available for download and use on a customer computing device 104, such as applications for use on a tablet or smartphone computing device. Alternately, the software products 112 may be virtual machine images or other types of software components that may be executed on computing resources provided by the service provider network 114.

At some point after submission of the software products 112, the electronic marketplace environment 106 may make the software product 112, as well as other software products 112 submitted to the electronic marketplace 108, available to customers. As used herein, the terms "customer" and "customers" refer to existing customers of the electronic marketplace 108 provided by the electronic marketplace environment 106 and/or the service provider network 114 as well as visitors (i.e. potential customers) to the electronic marketplace 108 and/or the service provider network 114.

A customer, using a customer computing device 104, may access the electronic marketplace 108 to browse and acquire or purchase software products 112 made available by the electronic marketplace environment 106 by the software providers. As used herein, a "purchase" of the software product may result in no payment from a customer (e.g., a free software product), a one-time payment from a customer, or may result in payments from a customer that are made on an ongoing basis depending upon how the software is utilized and executed. In some examples, a purchase of a software product establishes a subscription to the software product that allows the customer to execute the software product at a specified usage fee. The specified usage fee may be based on different factors such as a time the software product is executed, a number or type of resources used by the software, a number of operations performed by the software product, and the like.

After acquiring the software product 112, the customer may configure the software product 112 and launch the software product 112 for execution. In some examples, such as in the case of a tablet or smartphone application, the software product 112 may be downloaded from the electronic marketplace environment 106 and executed on the customer computing device 104. In other examples, the software product 112 executes in a service provider network 114 that is operated, maintained, provided and/or otherwise associated with an the operator of the electronic marketplace 108. In some examples, the service provider network 114 might be operated by a different entity than the entity that operates the electronic marketplace 108.

As described in more detail below, the service provider network 114 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

In the illustrated example, the electronic marketplace 108 is implemented by several computer systems that are interconnected using one or more networks. More specifically, the electronic marketplace 108 may be implemented by a marketplace service 120, the electronic software product catalog 110 including the software products 112, a monitoring service 116, and a billing service 122. It should be appreciated that the electronic marketplace 108 may be implemented using fewer or more components than are illustrated in FIG. 1. For example, all or a portion of the components illustrated in the electronic marketplace environment 106 may be provided by the service provider network 114 as illustrated by a dashed line around the electronic marketplace environment 106 and the service provider network 114. In addition, the electronic marketplace environment 106 could include various Web services and/or peer-to-peer network configurations. Thus, the depiction of the electronic marketplace environment 106 in FIG. 1 should be taken as illustrative and not limiting to the present disclosure.

The marketplace service 120 facilitates submission of the software products 112 by software providers and browsing and acquisition by customers of software products offered through the electronic marketplace 108. Accordingly, a software provider utilizing a software provider computing device 102 may submit one or more software products 112 to the electronic marketplace 108 via the marketplace service 120. In the current example, the software provider computing device 102 is shown as submitting a software product 112A. The submitted software product 112A may then be included in an electronic software product catalog 110.

The software product catalog 110 is a data store that includes information on software products 112 submitted from different software providers. Accordingly, the marketplace service 120 may obtain software products from software providers and make the software products available to a customer from a single network resource, such as a Web site. In some examples, the software product catalog 110 may include a category designation for the software products 112. For example, the software products 112 that perform the same or similar functionality may have the same category designation.

Illustratively, the marketplace service 120 may generate one or more user interfaces, such as a user interface 136, through which a customer, utilizing the customer computing device 104, or some other computing device, may browse the available software products 112, submit queries for matching software products and view information regarding specific software products available from the electronic marketplace. A customer may purchase a software product 112 from the electronic marketplace 108, configure the software product 112 and launch the software product 112 for execution (e.g., on a customer computing device 104 and/or in the service provider network 114).

The marketplace service 120, or some other computing device, may facilitate the purchase of the software product 112. In this regard, the marketplace service 120 may receive payment information from the customer computing device 104. The marketplace service 120 may also establish an account or update an account for a customer. The account information may include a variety of different information, such as one or more payment methods, billing preferences, address information, communication preferences, privacy preferences, and the like. This information might be obtained by the marketplace service 120 and provided to the billing service 122. The billing service 122 may also be configured to process payments from customers and, in some examples, provide payment to the software providers of the software products 112.

The usage-monitoring service 138 can be configured to monitor a use of the software products 112 that are purchased by customers. For example, the usage-monitoring service 138 may be in communication with the monitoring manager 130 and the service provider network 114 and is operable to monitor usage of the functionality provided by the software product 112. The usage data 130F1-130F2 (which may be referred to herein as "usage data 130F") might include data such as a usage time of the software product 112, a number of virtual machine instances utilized to execute the software product 112 in the service provider network 114, an amount of bandwidth used by the software product 112, a CPU utilization of the software product 112, a memory use of the software product 112, an amount of storage used by the software product 112, other software products 112 or services accessed by the software product 112, or the like. The usage data 130F1 may be associated with a use of the software product 112 in the service provider network 114. The usage data 130F2 may be associated with the use of the software product 112 on another computing device, such as the customer computing device 104. In some examples, the usage data 130F generated by the usage-monitoring service 138 might be used by the monitoring service 116 to detect trends in the usage associated with a software product 112. For example, the usage data may indicate user spending less time interacting with the software product 112 or more time interacting with the software product 112.

In the example illustrated in FIG. 1, the monitoring service 116 includes a monitoring manager 130, a popularity predictor 132 and a risk predictor 134. While the monitoring manager 130, the popularity predictor 132 and the risk predictor 134 are illustrated within the monitoring service 116, all or a portion of these components may be located in other locations. For example, the popularity predictor 132 and the risk predictor 134 may be located externally from the monitoring service 116 at some other location in the electronic marketplace environment 106 or the service provider network 114. Similarly, the monitoring manager 130 may be part of the marketplace service 120, and the like.

As discussed in more detail below, the monitoring service 116, utilizing the monitoring manager 130, may generate a predicted popularity of software products 112 as well as identify software products 112 that are or may be likely to exhibit anomalous behavior. The monitoring manager 130 can use the popularity predictor 132 to generate a popularity prediction for one or more software products 112 within the software product catalog. According to some examples, the popularity predictor 132 predicts the popularity of a software product using download data that indicates information about acquisition of the software product. For instance, the download data can indicate the number of downloads of a software product 112, revenue generated by the software product 112, number of installs of the software product 112, usage of the software product 112, and the like. According to some configurations, the predicted popularity can be based on the number of downloads (e.g., compare the number of downloads to other software products available from the electronic marketplace) and possibly on other types of data as described in more detail below.

In some examples, the monitoring manager 130 may use the risk predictor 134 to identify the software products 112 exhibiting anomalous behavior. As discussed in more detail below, the risk predictor 134 can classify each of the software products 112 within a classification category and/or generate a score for the software products 112 that indicates a risk of anomalous behavior. In some configurations, the risk predictor 134 can also identify software products 112 that violate one or more content policies associated with the electronic marketplace and/or some other entity. For example, the risk predictor 134 can identify that a software product 112A violates the IP rights of another software provider, includes content that is not appropriate to a category associated with the software product 112, and the like. Score data 130C associated with the scores generated by the risk predictor 134 or some other device or component may be stored in the data store 127 (or some other memory) by monitoring manager 130. The predicted popularity of a software product 112 and the risk associated with a software product 112 can be determined by the popularity predictor 132 and/or the risk predictor 134 in response to an occurrence of an event and/or in response to an expiration of time (e.g., daily, weekly, monthly).

According to some configurations, the monitoring service 116 may be configured to use one or more machine learning mechanisms and/or statistical mechanisms to predict the popularity of the software products 112 and to identify the software products 112 that may be exhibiting anomalous behavior. For example, a linear regression mechanism may be used by the monitoring service 116 to generate a score that indicates a severity of the identified anomalous behavior. Linear regression may refer to a process for modeling the relationship between one variable with one or more other variables. Different linear regression models might be used to calculate the score. For example, a least squares approach might be utilized, a maximum-likelihood estimation might be utilized, or another approach might be utilized. The linear models may be simple linear models (e.g., a single predictor variable and a single scalar response variable) or may be multiple regression models (e.g., multiple predictors). The models might also be general linear models, heteroscedastic models, generalized linear models (e.g., Poisson regression, logistic regression, or multinomial logistic regression), Bayesian linear regression, quantile regression, and the like.

The risk predictor 134 may utilize a classification mechanism to classify the software products 112 analyzed by the risk predictor 134 into a classification category. For example, the risk predictor 134 can classify a software product 112 into a first category indicating anomalous behavior, or into a second category indicating minor or no anomalous behavior. In other configurations, the risk predictor 134 may select from more than two categories when classifying a software product. For instance, the risk predictor 134 might classify an analyzed software product 112 into one of two, three, four, or some other number of categories. The classifications of the software products 112 can be stored by the monitoring manager 130 within the data store 127 (or some other memory) as classification data 130B. According to some examples, random forests may be utilized by the risk predictor 134. Generally, random forests are a learning method for classification that operate by constructing a multitude of decision trees at training time and outputting the class that is the mode of the classes output by individual trees. Unlike single decision trees (e.g., J48) which may to suffer from high variance or high bias (depending on how they are tuned), random forests use averaging to find a natural balance between the two extremes. In some examples, the data used by the random forests included the device models, the number of downloads, rating data, crash data, and the like that are associated with the software products 112.

According to some techniques, one or more models utilized by the monitoring service 116 are trained to identify the relationship between generated features and the "riskiness" that a software product 112 exhibits or is likely to exhibit anomalous behavior. In some examples, the models utilize data associated with ratings, download counts, customer engagement, reviews, crash counts, marketplace data. The data can be gathered from one or more services (not shown) that collect or provide this type of data, from customer computing devices 104 (when authorized) and/or from usage-monitoring service 138.

According to some examples, the model(s) can be updated after initially being trained. During this re-training, the model(s) can be updated to include new behaviors as well as remove unwanted behaviors. For example, data relating to computing devices that are no longer relevant can be removed from the model(s). Conversely, data relating to new devices can be added to the model(s).

In some configurations, the monitoring manager 130 in the monitoring service 116 accesses and provides at least a portion of the software product data 130A to the popularity predictor 132 and to the risk predictor 134 to predict the popularity of the software products 112 and to identify the software products 112 that are at risk for, or are, exhibiting anomalous behavior. The software product data 130A may include data from a variety of data sources. For instance, the software product data 130A might include, but is not limited to, download data, crash data, ratings data, marketplace data, usage data, and the like (See FIG. 2 for more details). In some configurations, at least a portion of the software product data 130A is used to train one or more models utilized by the machine learning mechanism(s).

In some configurations, the popularity and risk data 130B and/or score data 130C may be used by the monitoring manager 130 to determine whether further analysis of a software product 112 should be performed. For instance, the monitoring service 116 may cause one or more of the software products identified as popular or predicted to be popular and exhibiting, or likely to exhibit, anomalous behavior to a testing service 144 for automated and/or manual testing.

As illustrated, the monitoring service 116 transmits a test request 128 to the testing service 144. The test request 128 requests the testing service 144 to perform one or more tests on one or more software products 112. In some configurations, the monitoring service 116 determines the software products 112 to test based on the available resources of the testing service. For example, the monitoring service 116 may submit a test request 128 to test the software products 112 that are included in one category but not test the software products that are included in another category. Similarly, the monitoring service 116 may submit a test request 128 that includes the software products 112 identified as being popular and exhibiting anomalous behavior that exceeds some specified threshold (e.g., using the score data 130C).

In other examples, the identification that the software product 112 is exhibiting anomalous behavior may be used by the monitoring service 116 to notify the software provider of the software product 112 of the issue. The identification that the software product 112 is exhibiting anomalous behavior may also be used by the monitoring manager 130 to remove (temporarily or permanently) the software product from the electronic marketplace 108. For instance, the software products that are classified as exhibiting anomalous behavior or have a score indicating anomalous behavior may be excluded from the electronic marketplace until the issue causing the anomalous behavior is addressed.

As briefly discussed above, the identification that a software product 112 may be exhibiting anomalous behavior might be used for a variety of different purposes. For example, the software product 112 may not be included in the software product catalog 110. In other examples, the software product 112A might be submitted to the testing service 144 for further testing and/or analysis. Data from this further testing might be provided back to the monitoring service 116 and used for tuning the machine learning mechanism that may be utilized in some configurations.

The testing service 144 might perform automated and/or manual testing on software products 112. The testing service 144 might include automated tests that test various types of functionality of the software product 112. In addition, or alternatively, a human tester might also perform manual tests or analysis on the software product 112. The tests may be used to determine whether a software product 112 operates as intended on a variety of different hardware devices. The tests may be performed using the testing service 144 on a variety of different computing devices and/or device emulators. For example, the device emulators might emulate the physical hardware of devices, like smartphones or tablet computers, having different hardware and/or software configurations.

Figure 3:
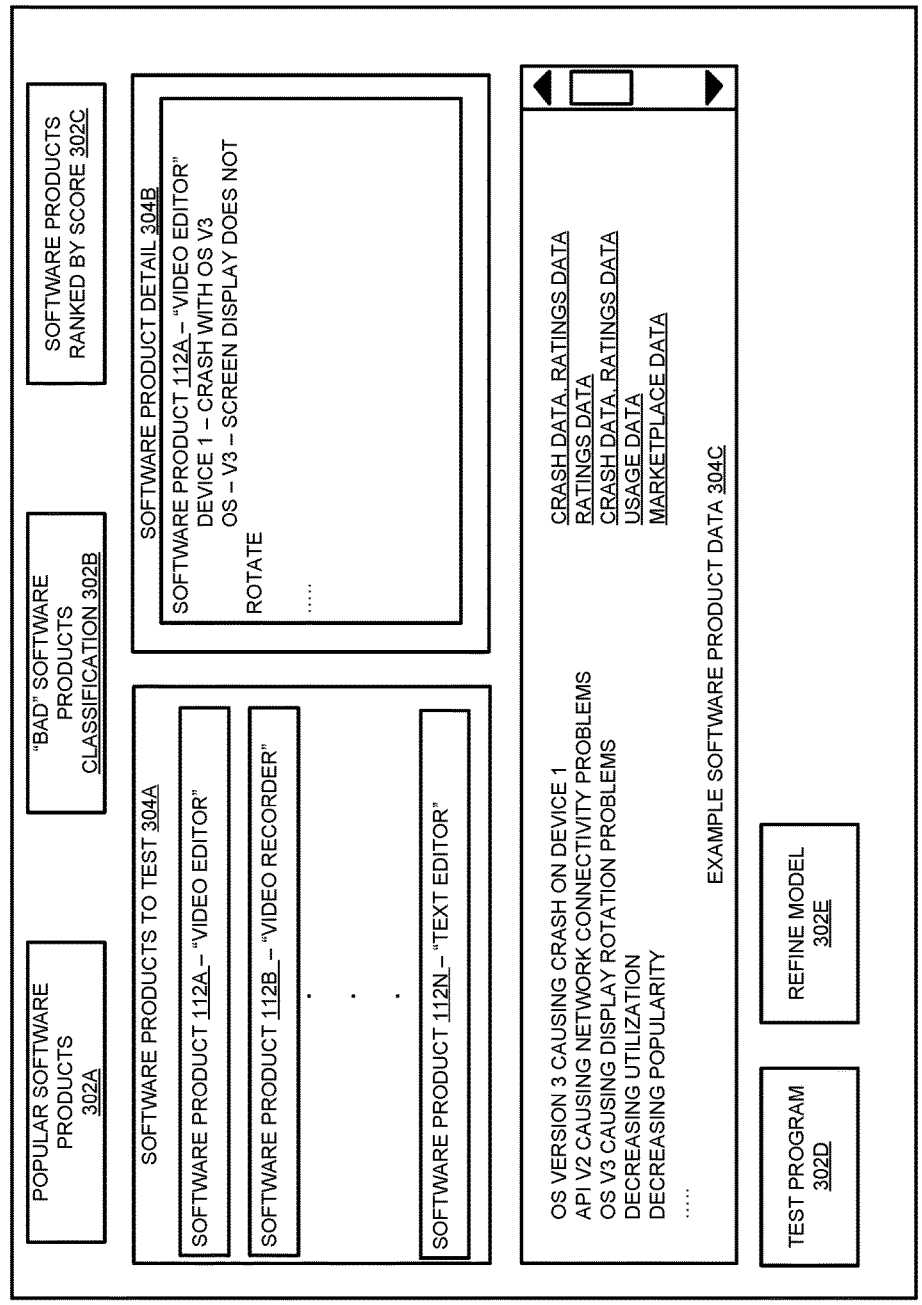
FIG. 3 is a screen diagram showing a graphical user interface used to interact with the monitoring service.

In some examples, results of the prediction of popularity, results obtained from the risk predictor, classification and scoring of the software products may be provided to an authorized user. For instance, rankings, classifications and the scores may be displayed within a graphical user interface (e.g., as illustrated in FIG. 3), or provided in some other manner. In some configurations, the results may be used to further refine the machine learning mechanism. For example, the authorized user might adjust the weight of different parameters used by the popularity predictor 132 and/or the risk predictor 134. Adjusting the weighting of different parameters within the machine learning mechanism may cause some parameters to be more influential in identifying the software products 112 to test.

Figure 2:
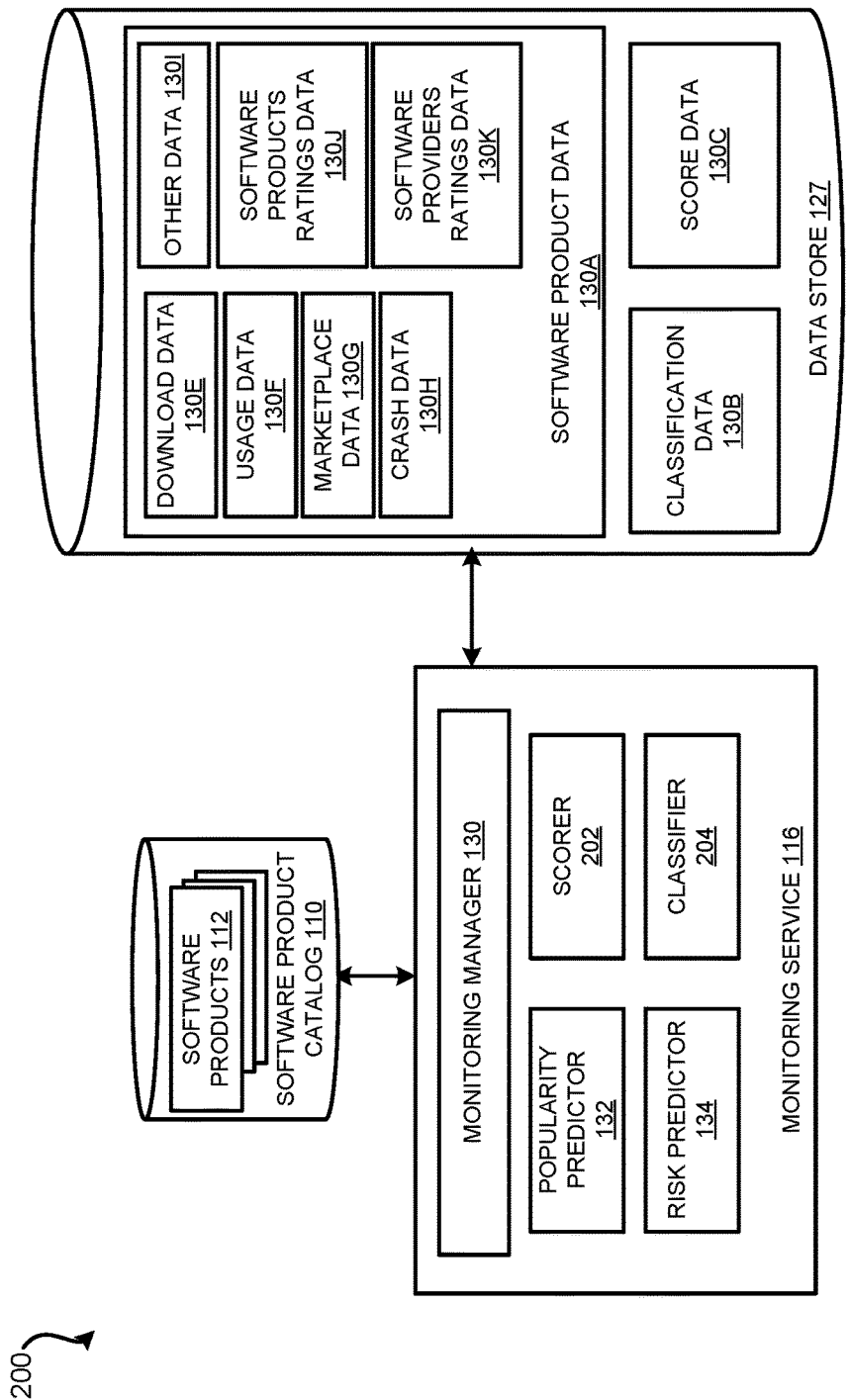
FIG. 2 is a block diagram depicting an illustrative operating environment in which a monitoring service analyzes data associated with software products to predict a popularity of a software product and to identify anomalous behavior of a software product.

FIG. 2 is a block diagram depicting an illustrative operating environment 200 in which the monitoring service 116 analyzes data associated with the software products 112 to identify software products to test. As illustrated in FIG. 2, the operating environment 200 includes the monitoring service 116 that may be utilized in predicting the popularity of software products 112 and identifying software products 112 from the software product catalog 110 that may be exhibiting anomalous behavior.

As discussed above, the monitoring service 116 may utilize a popularity predictor 132 to predict the popularity of software products 112 within an electronic marketplace, and a risk predictor 134 to identify software products 112 that are exhibiting anomalous behavior or are at risk of exhibiting anomalous behavior. The monitoring service 116 can also utilize a scoring mechanism, such as the scorer 202, and/or a classification mechanism, such as the classifier 204 to identify software products 112 available from an electronic marketplace 108 to test. In some configurations, the monitoring manager 130 in the monitoring service 116 accesses the software product data 130A included in the data store 127. As briefly discussed, the software product data 130A might include data such as the download data 130E, usage data 130F, marketplace data 130G, crash data 130H, software products ratings data 130J, software providers ratings data 130K, and other data 130I.

Generally, the monitoring service 116 may monitor and/or access software product data 130A indicating software product 112 downloads, install, uninstalls, software product 112 launches, session time for a software product 112, software product 112 usage, revenues for the software product 112, repeat usage of the software product 112, interactions with the software product 112 and the like. According to some configurations, the monitoring service 116 identifies patterns relating to the software products 112. For instance, the monitoring service 116 may identify software product 112 download trends, search query trends, software product detail page views, identify purchase intents, and the like. The monitoring service 116 might also identify reimbursement requests made by customers, complaints and the like. For example, an increasing number of uninstalls and/or short session time, for example less than one second, may indicate a potentially anomalous software product 112. Similarly, a decrease in the number of downloads of a software product can indicate a decrease in popularity of the software product. Other indicators that may indicate a potentially anomalous software product include but are not limited to crashes, types of crashes, a risk associated with the developer (e.g., has the developer had other applications that exhibited anomalous behavior), and the like. As discussed herein, the monitoring service 116 may utilize one or more models and learning mechanisms to identify the patterns relating to the software products 112.

The monitoring service 116 may access one or more data sources to obtain data related to the software products 112 available from the electronic marketplace 108, or some other electronic marketplace. For instance, other software product data associated with other electronic marketplaces stores might be obtained and utilized by the monitoring service 116. Data from search engines, web sites, and the like might also be obtained and utilized by the monitoring service 116. The following are some example types of data that might be utilized by the monitoring service 116 to identify software products 112 that may be exhibiting anomalous behavior.

As described above, the download data 130E may include data related to acquisition of a software product 112, such as the number of downloads of a software product 112. The usage data 130F may include data related to a use of a software product 112. For example, the usage data 130F might include data indicating how the software product 112 is being utilized on a customer computing device 104 or within a service provider network 114. The usage data 130F might indicate how often or how long the software product 112 is utilized, interactions with the software product 112, frequency of installs or uninstalls of the software product 112, and the like.

The marketplace data 130G might include data that provides an indication of a current popularity of software products 112. For instance, the marketplace data 130G may include data that indicates revenue for the software product 112, a past or current popularity of software products 112, the past or present popularity of software providers, titles of current software products 112, images (e.g., icons or screen captures) of software products 112, and/or other data. The marketplace data 130G might also include an average number of downloads of software products within a specified category, a number of downloads associated with a particular software provider, ratings of software products or software providers, advertising revenue generated by the software products or software providers, and the like.

According to some examples, the popularity predictor 132 utilizes the number of downloads to determine a moving average trend model for the downloads within a predetermined time period. The moving average trend can be for a day, a week, two weeks, and the like. While the average number of downloads, and the total number of downloads can be used to predict the popularity of a software product (e.g., compare the average number of downloads for a software product with the average number of downloads of other software products), the popularity predictor 132 can use additional data in predicting the popularity of a software product. In some examples, the popularity predictor 132 uses revenue data, engagement data, and ratings data in combination with the download data to predict the popularity of the software product 112.

According to some configurations, the popularity predictor 132 can adjust the popularity of the software product 112 up or down based at least in part on how engaged users are with the software product 112, the number of reviews for the software product 112, and the like. For example, in some instances, it has been found that the number ratings for unpopular software products may be very small compared to the number of ratings for popular software products. According to some configurations, the popularity predictor 132 creates a normalized rating for a software product using the following equation: Normalized Rating=Number of 1 and 2 star ratings−number of 4 and 5 star ratings/number of 1, 2, 3, 4, and 5 star ratings.

As briefly mentioned, the number of ratings for a software product 112 can be sparse. In an attempt to better utilize the ratings data, a Binomial confidence interval can be used by the popularity predictor 132 to obtain more confidence in using the sparse ratings data. For purposes of explanation, assume the star ratings for a software product 112 is a sample from a binomial distribution (1,2 as negative) and (4,5 as positive). Using this measure provides more confidence in the use of the ratings data.

The risk predictor 134 can also use developer ratings to determine the risk of an anomalous software product 112. In some configurations, the monitoring manager 130 generates a score for the developer (i.e., a developer risk score) that is based on a developer's recent history of submitted software products. A high risk score indicates that the software products provided by the developer content policy or functionality issues. A low score indicates a more trustworthy developer. In some configurations, the risk score for a developer is limited to a predetermined time period such that a developer can decrease the developer risk score.

The popularity predictor 132 and risk predictor 134 can also use engagement data in determining the popularity of the software product and determining whether the software product is exhibiting anomalous behavior. In some examples, the engagement data includes, but is not limited to time spent using the software product, number of repeat users, number of new users, number of installs, and number purchases.

According to some configurations, the popularity predictor 132 and risk predictor 134 can utilize text reviews for software products in determining the popularity of the software product and determining whether the software product is exhibiting anomalous behavior. In addition to, or alternatively to star ratings, or some other rating system, a user may enter text reviews of software products. For example, some reviews may indicate that the software product is great, whereas other reviews may call out specific problems with the software product captured in text reviews. In some configurations, the monitoring manager 130 can extract topics from the text reviews using a topic discovery model such as the Latent Dirichlet Allocation (LDA) model. Generally, the LDA model discovers different topics that are within a sentence. According to some examples, unsupervised learning can be used to analyze and cluster text reviews such that the customer's voice is not changed by a domain bias. The identified topics can then be machine labelled or labelled by human experts (e.g., one topic relates to complaints about battery issues, other complaints on login problems). These topics can then be used by the popularity predictor 132 and risk predictor 134 to determine the popularity of the software product and determining whether the software product is exhibiting anomalous behavior.

The crash data 130H might be data that is obtained from a crash (e.g., stops executing) of the software product 112 (e.g., crashed on a customer computing device or within a service provider network). The crash data 130H might be obtained shortly after the crash or at some point in time after the crash. For example, the crash data 130H may be obtained from a dump file that is created at the time the software product crashes. Generally, a dump file provides a snapshot of the software product at the time the crash occurs. The dump file might include information such as, but not limited to, what process was executing, what modules were loaded, what was in memory, and the like.

The software products ratings data 130J may include data related to a review or rating of a software product 112. For instance, the software products ratings data 130J might include positive or negative reviews of a software product. The software providers ratings data 130K may include data related to a review or rating of a software provider. For instance, the software providers ratings data 130K might include positive or negative reviews of a software provider.

The other data 130I might include other data that may be utilized by the monitoring service 116 when identifying the software products 112 to test. For example, a data indicating that a software product that is provided by a software provider that does not have a history of providing high quality software products may provide an indication that the software product is more likely to be exhibiting anomalous behavior as compared to a software product provided by an established software provider.

As discussed, the monitoring service 116 programmatically analyzes at least a portion of the software product data 130A to predict the popularity of a software product 112 and to identify behavior of software products 112 that may be considered anomalous behavior. In some examples, the crash data is analyzed to determine what caused the software product to crash.

After generating the predicted popularity of the software products 112 and determining the risk of anomalous behavior of software products 112, the monitoring manager 130 can identify the software products 112 to test. As previously discussed, in an attempt to limit a bad customer experience for a large number of customers, the monitoring manager 130 attempts to identify the software products 112 to test that may affect the largest number of customers. The sooner a bad software product can be identified and removed from the software catalog, the fewer customers are affected by the bad software product.

According to some techniques, the monitoring manager 130 provides equal weight to the predicted popularity and to the risk of anomalous behavior. For example, when the predicted popularity value and the risk of anomalous behavior value are normalized, the software product having the highest value is identified to be tested first. In other examples, the monitoring manager 130 may assign different weights to the predicted popularity value and the risk of anomalous behavior value for each of the software products. For example, more weight can be placed on the predicted popularity value.

FIG. 3 is a screen diagram showing a graphical user interface used to interact with the monitoring service 116. In the example shown in FIG. 3, the GUI 300 presents an interface that includes UI elements 302A-302F, a software products to test 304A section, a software products detail 304B section, and an example of software product data 304C section. The GUI 300 might be generated by the monitoring manager 130 as shown in FIG. 1, or some other computing device or component, and presented on a computing device by an application. For example, the application might be a web browser program. The GUI 300 is illustrated for explanation purposes, and is not intended to be limiting. For example, the GUI 300 might include more or fewer UI elements than illustrated in FIG. 3. The UI elements might also be arranged in a different manner than shown in FIG. 3.

The popular software products UI element 302A is configured to display the names of the software products 112 that are identified as popular. The classification UI element 302B is configured to display the names of the software products 112 that are classified within a "BAD" software product categorization. As illustrated, the popular software products UI element 302A, when selected, displays a listing of the software products 112 determined to be popular. The classification UI element 302B, when selected, displays the software products 112 classified as "bad" software products within the software products section 304A. The software products ranked by score 302C UI element is configured to rank the software products 112 according to the determined scores for the software products 112 in response to being selected.

In the current example, a user has selected to view the software products 112 in a ranked order of software products 112 identified for testing. As illustrated, the software products 304A section includes a display of the software products 112A-112N ranked by score. In this way, an authorized user, such as a tester, or a manager, can readily see a listing of the software products 112 that are identified to be tested.

In addition to seeing the software products 112 identified to be tested, the authorized user can view other data generated by the monitoring manager 130, and/or the popularity predictor 132, and/or the risk predictor. For example, the user can view the popular software products, and the bad software products. In some examples, the software products 112 included within the listing illustrated in the software products 304A section are sorted based on the score associated with the software products 112. For example, the software products 112 included in the "bad" software product classification may be displayed within the software products 304A section alphabetically, by score, or by some other filtering parameter.

The software product detail 304B section displays data associated with a selected software product 112. In the current example, a user has selected the "Video Editor" software product 112A displayed within the software products 304A section. In response to receiving the selection, the GUI 300 is updated to display data associated with the selected software product 112 within the software product detail 304B section. As illustrated, the software product detail 304B section shows anomalous behavior identified from the software product data sources 130A.

The example of software product data 304C section displays data associated with anomalous behavior detected or identified by the monitoring service 116 and/or the testing service 144. In the current example, the example of software product data 304C section displays data for the selected software product 112 that is associated with the software product detail 304B section. As illustrated, the example of software product data 304C section includes data indicating that the "Video Editor" software product 112 crashed on device 1 when using version 3 of an operating system. The data also indicates that application programming interface ("API") version 2 is causing network connectivity problems, that OS V3 is causing display rotation problems, and that there is a decreasing utilization and popularity of the software product 112.

Next to the display of the anomalous behavior, the data source from which the information about the anomalous behavior was obtained is displayed. In the current example, the data sources include crash data, ratings data, usage data, and marketplace data. As discussed above, more or fewer data sources may be utilized. In some configurations, the user viewing the GUI 300 might select a link (as indicated by the underlining within the example software product data 304C section to view the data source that provided the software product data 130A.

The test program UI element 302D, when selected, causes one or more of the software products 112 to be tested by the testing service 144. In other examples, when the test program UI element 302D is selected, the testing services of the testing service 144 are provided to the user viewing the GUI 300. For example, the user may select the test program UI element 302D to perform additional testing on one or more of the software products 112A-112N. The refine model element 302E, when selected, provides a mechanism for the user to refine one or more models utilized by the monitoring service 116.

Figure 4:
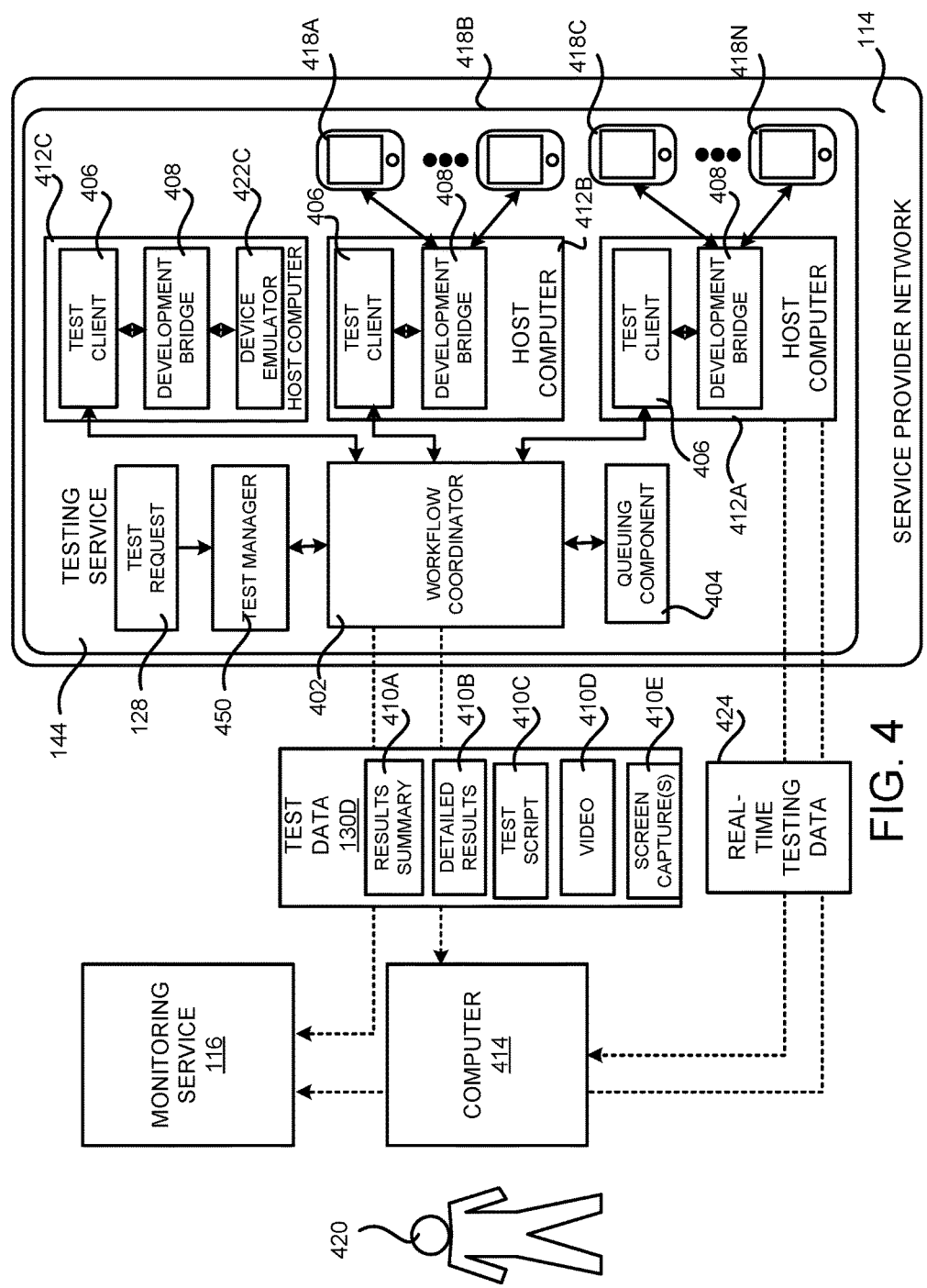
FIG. 4 is a block diagram depicting an illustrative operating environment for testing the operation of a software product and providing test results to a requestor.

FIG. 4 is a block diagram depicting an illustrative operating environment for testing the operation of a software product 112 and providing test results to a requestor. As shown in FIG. 4 and described briefly above, the testing service 144 may provide a network-based service for testing the operation of one or more programs, such as the software products 112. For example, the testing service 144 may be associated with a service provider network 114. As mentioned above, the software products 112 might be submitted to the testing service 144 in a test request 128 by the monitoring service 116 and/or some other user, or in another manner. One illustrative operating environment for testing the operation of a program is described in U.S. patent application Ser. No. 13/875,955, which was filed on May 2, 2013, and entitled "Program Testing Service," and which is expressly incorporated herein by reference in its entirety.

In some examples, a workflow coordinator 402 within the testing service 144 receives the test request 128. As will be described in greater detail herein, the workflow coordinator 402 is a component that is configured to assign test requests 128 to host computers 412A-412C within the testing service 144. The workflow coordinator 402 might also receive test data 130D from the various host computers 412A-412C and provide the test data 130D to the computer 414 that submitted the test request 128, or to some other computing device.

In some examples, the workflow coordinator 402 may be configured to determine whether the test devices, such as the computing devices 418A-418N and/or the device emulators 422 that may be requested in the test request 128 are available for use in testing the software products 112. In other examples, the workflow coordinator 402 may be configured to determine whether the test devices that may be requested by the test manager 450 are available for use in testing the software products 112. When the requested computing devices 418A-418N and/or the device emulators 422 are not available, the workflow coordinator 402 might utilize a queuing component 404 to queue the test request 128 the requested computing devices 418A-418N and/or device emulators 422A-422N become available.

In some implementations, the test of the software products 112 identified by a test request 128 may be queued if one or more of the test devices are unavailable. In other examples, only those test requests 128 that request tests to be performed on unavailable test devices might be queued. Other mechanisms might also be utilized for queuing test requests 128 in other implementations.

If the test devices upon which the test of the software products 112 is to be performed are available, the workflow coordinator 402 may transmit the test request 128 to test clients 406 executing on the host computers 406A-406C. For example, if a test request 128 indicates that the software products 112 are to be tested while executing on a computing device 418A, the workflow coordinator 402 may transmit the test request 128 to the test client 406 executing on the host computer 412. In a similar fashion, if a test request 128 indicates that a test is to be performed using a device emulator 422A, the workflow coordinator 402 may transmit the test request 128 to the test client 406 executing on the host computer 412A.

The test client 406 executing on each of the host computers 412A-412C may be configured to receive test requests 128 from the workflow coordinator 402. According to some examples, the test clients 406 are configured to systematically interact and test the software products 112 for anomalous behavior, as discussed herein. In response to receiving a test request 128, the test client 406 may cause a development bridge 408 to install the software product 112 on the computing device 412 or the device emulator 422 to be tested. According to some configurations, the development bridge 408 provides a mechanism for interacting with a connected computing device 412 or device emulator 422.

In some configurations, the development bridge 408 is the ANDROID Debug Bridge. The ANDROID Debug Bridge may be utilized when the computing devices 418A-418N and/or the device emulators 422A-422N utilize the ANDROID operating system. Other types of bridges might also be utilized when computing devices 418A-418N and/or device emulators 422 configured with other operating systems from other manufacturers are utilized to test the operation of a software product 112.

Once the software product 112 to be tested has been installed on the computing devices 418A-418N and/or device emulators 422 upon which testing should occur, the operation of the software product 112 may be tested using the test manager 450. As described above, the software product 112 may be tested by the test manager 450, the test client 406, or some other component. As discussed above, the testing is configured to test various aspects the operation of the software products 112 on the target computing devices 418A-418N and/or device emulators 422.

According to some examples, the host computers 412A-412C may be configured to transmit real-time testing data 424 to the computer 414, or some other computing device, while the testing of the software products 112 is being performed. For example, in some implementations, the real-time testing data 424 includes text data describing the on-going testing of a software product 112 (e.g., the current event being performed) on a particular computing device 418A-418N or device emulator 422. In other implementations, the real-time testing data 424 may include one or more screen captures 410E, or a video display 410D output generated by one of the computing devices 418A-418N and/or device emulators 422 utilized for testing.

The real time testing data 418 might then be presented on the computer 414 for viewing by an authorized user. In this manner, the user, can view the real time operational testing of the software products 112 on a computing device 418A-418N or device emulator 422. When multiple tests are being performed simultaneously, a mechanism might be utilized at the computer 414 that allows the user 420 to select a computing device 418A-418N and/or device emulator 422A-422N for which the real-time testing data 424 is displayed.

Once the testing of the software products 112 has completed on the computing devices 418A-418N and/or the device emulators 422A-422N, each of the host computers 412A-412C provides test data 130D to the workflow coordinator 402. In turn, the workflow coordinator 402 provides the test data 130D to the monitoring service 116 and/or the computer 414. As shown in FIG. 4, the test data 130D might include a results summary 410A, which indicates whether the tests passed or failed. The test data 130D might also include detailed results 410B that include detailed information regarding the performance of the tests on the computing devices 418A-418N and/or device emulators 422. For example, the detailed results 410B might include log files and/or other detailed results generated by the computing device 418, emulator 422, and/or development bridge 408 during the testing of the software products 112 on the computing devices 418A-418N and/or the device emulators 422. In some examples, the test data 130D includes a test script 410C. The test script 410C might be used by the user 420 to recreate the test and/or view the steps that were part of one or more tests performed by the testing service 144.

In some implementations, the test data 130D also includes screen captures 410E taken on the computing devices 418 and/or the device emulators 422 during the testing of the software products 112. Similarly, the test data 130D might also include video 41D captured from the computing devices 418 and/or the device emulators 422 during all or a portion of the testing of the software products 112. The content of the test data 130D illustrated in FIG. 4 are merely illustrative and that other types of information might be provided in the test data 130D.

Appropriate functionality might also be provided at the computer 414 for presenting the test data 130D to the user 420. Utilizing the test data 130D, the user 420 can make changes to the software products 112. The user 420 might then resubmit the software product 112 to the testing service 144 for continued testing in the manner described herein.

Figure 5:
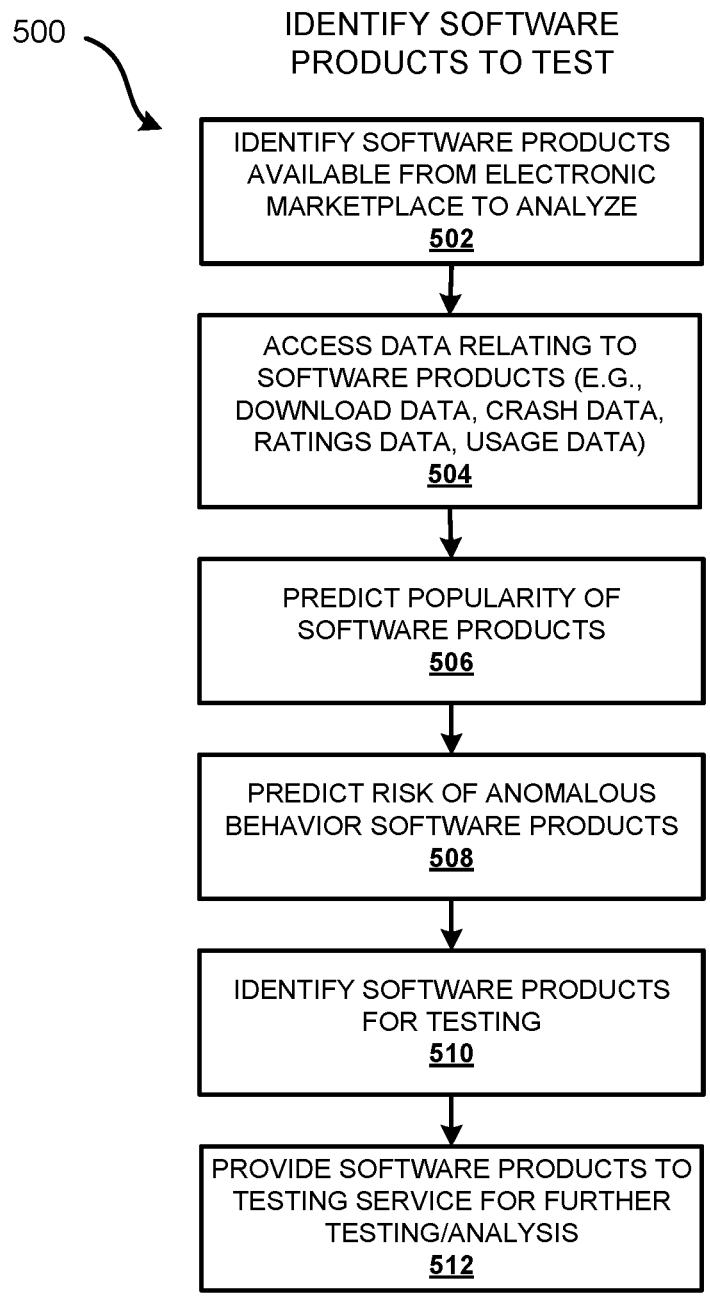
FIG. 5 is a flow diagram showing a routine illustrating aspects of a mechanism disclosed herein for identifying software products to test.
Figure 6:
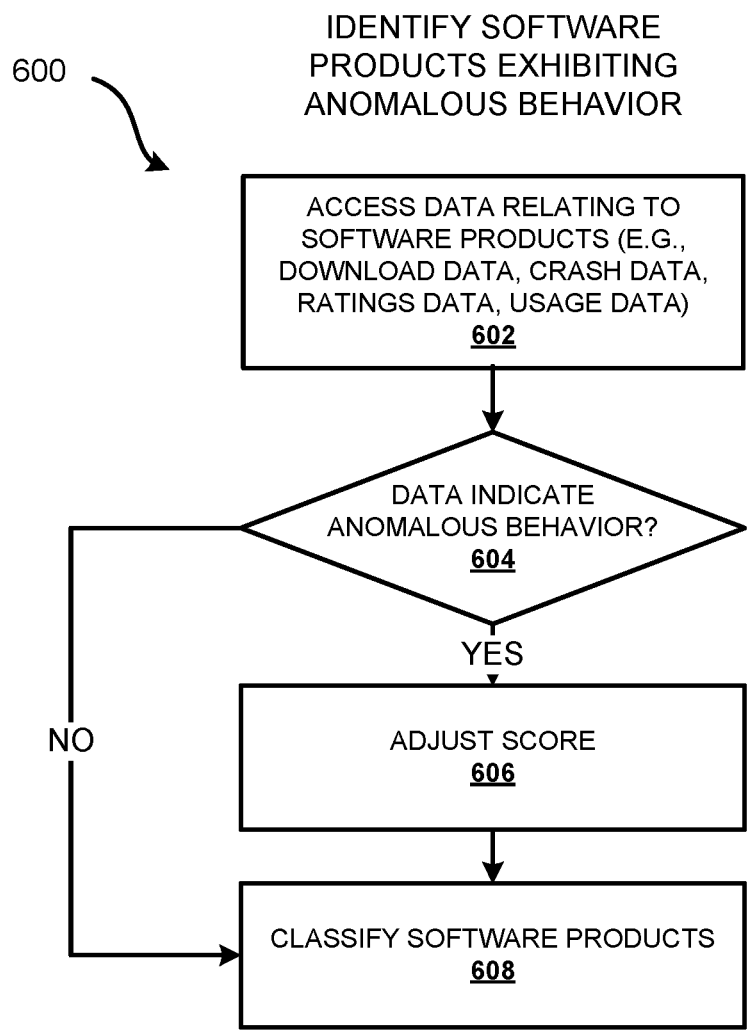
FIG. 6 is a flow diagram showing a routine illustrating aspects of a mechanism disclosed herein for identifying software products that may be exhibiting anomalous behavior.

FIGS. 5 and 6 are flow diagrams showing routines 500 and 600 that illustrate aspects of identifying software products 112 to test. It should be appreciated that the logical operations described herein with respect to FIG. 5, FIG. 6, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Turning now to FIG. 5, routine 500 illustrates aspects of identifying software products to test. The routine 500 may begin at 502, where one or more software products 112 are available from the electronic marketplace 108 are identified to be analyzed. As discussed above, all or a portion of the software products 112 associated with an electronic marketplace 108 may be identified. In some examples, the software products 112 that have not been analyzed within a specified period of time are identified. In other examples, the software products 112 that have recently been added (e.g., within the last day, week, two weeks, month) to the software product 110 are identified to be analyzed. In other examples, all of the software products that are part of the software product catalog 110 are identified.

At 504, data related to the identified software products 112 is accessed. As discussed above, the software product data 130A may include data such as download data, crash data, ratings data, usage data, marketplace data, and the like. In some examples, the software product data 130A may be stored by the electronic marketplace environment 106, the service provider network 114, and/or at some other location.

At 506, the popularity of one or more software products is predicted. As discussed above, the popularity predictor 132 may generate a value, or some other indicator, that indicates a predicted popularity of a software product within the electronic marketplace. In some examples, the popularity predictor 132 uses download data associated with the software product when generating the predicted popularity. According to some techniques, the popularity predictor 132 uses other data, such as ratings data, revenue data, number of installs, session length, and the like in generating the prediction.

At 508, the risk of anomalous behavior of one or more software products is predicted. As discussed above, the risk predictor 134 may use different types of data to determine the risk of anomalous behavior for a particular software product 112. For example usage data 130F, marketplace data 130G, crash data 130H, software products ratings data 130J, software providers ratings data 130K, software product 112 uninstalls, decreased software product 112 launches, decreased session time for a software product 112, decreased software product 112 usage, decreased revenues for the software product 112, decreased repeat usage of the software product 112, decreased interactions with the software product 112 and the like might indicate anomalous behavior of a software product 112. FIG. 6 provides more details regarding identifying anomalous behavior of a software product.

At 510, the software products to test are identified. As discussed above, the monitoring manager 130 can prioritize or rank a software product 112 using the predicted popularity of the software product along with the risk of anomalous behavior for the software product. In some examples, the monitoring manager 130 generates a list of software products 112 that are ranked according to a preference level for testing. For instance, the most popular software product that is exhibiting anomalous behavior is ranked at or near the top of the list whereas an unpopular software product 112 is ranked near the bottom of the list. In some cases, the decision to test or further analyze a software product may be based on the available resources of the testing service 144. For example, more software products 112 may be identified to be tested when there are more available resources as compared to when the testing service has fewer available resources. In other examples, the monitoring manager 130 may identify testing on some designated number or percentage of the identified software products 112.

At 512, the software products 112 identified to be tested are submitted to the testing service 144 for further analysis and/or testing. As discussed above, the monitoring manager 130 may instruct the testing service 144 to perform testing on the software products 112 identified for testing. According to some configurations, the monitoring manager 130 may instruct the testing service 144 to perform manual analysis and/or more programmatic analysis on the identified software products 112.

FIG. 6 is a flow diagram illustrating aspects of identifying software products that exhibit, or are likely, to exhibit anomalous behavior. The routine 600 may begin at 602, where data related to the identified software products 112 is accessed. As discussed above, the software product data 130A may include data such as download data, crash data, ratings data, usage data, marketplace data, and the like. In some examples, the software product data 130A may be stored by the electronic marketplace environment 106, the service provider network 114, and/or at some other location.

At 604, a decision is made as to whether the data indicates anomalous behavior. As discussed above, different types of data may indicate anomalous behavior. For example usage data 130F, marketplace data 130G, crash data 130H, software products ratings data 130J, software providers ratings data 130K, software product 112 uninstalls, decreased software product 112 launches, decreased session time for a software product 112, decreased software product 112 usage, decreased revenues for the software product 112, decreased repeat usage of the software product 112, decreased interactions with the software product 112 and the like might indicate anomalous behavior. In some examples, the risk predictor 134 utilizes one or more models to determine when a software product exhibits anomalous behavior. When the data does indicate anomalous behavior, the routine 600 may flow to 606. When the data does not indicate anomalous behavior, the routine 600 may flow to an end operation.

At 606, a scoring mechanism, such as the scorer 202, may be used to adjust and/or generate a score for all or a portion of the identified software products 112. In some examples, a score is generated for each software product 112 that is included within a category that indicates anomalous behavior. The score may be generated in a variety of ways, but as one example a scorer 202 may determine whether the software product 112 has crashed. If so, that may increase the score by adding a predetermine number of points. Conversely, the scorer 202 may determine, for instance based on crash data that a crash was due to a problem with the operating system or the device itself, and not the software product 112. If this is the case, the scorer may decrease the score by subtracting a number of points or determine that the software product is altogether not exhibiting anomalous behavior. In some examples, the scoring at 606 may be included within classifying the software products at 608.

At 608, the software products may be classified. As discussed above, the monitoring service 116 may use the classifier 204 to classify the software products 112 into two or more different categories using the software product data 130A and possibly other data. For instance, the classifier 204 might classify the software products 112 into a first category indicating anomalous behavior and into a second category indicating software products that are not exhibiting anomalous behavior.

Figure 7:
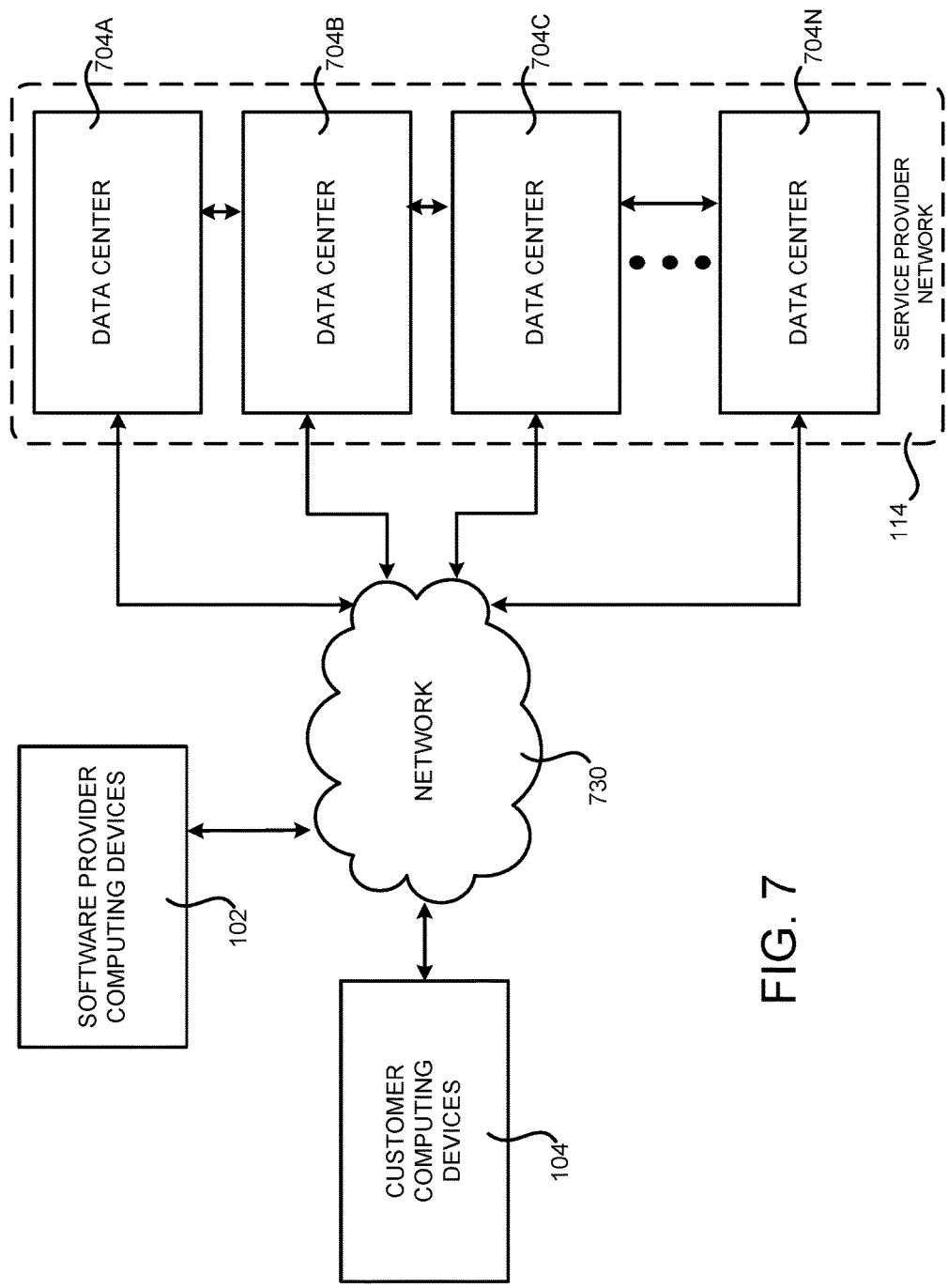
FIG. 7 is a system and network diagram that shows one illustrative operating environment for the examples disclosed herein that includes a service provider network.

FIG. 7 and the following description are intended to provide a brief, general description of a suitable computing environment in which the examples described herein may be implemented. In particular, FIG. 7 is a system and network diagram that shows an illustrative operating environment that includes a service provider network 114. As discussed above, the service provider network 114 can provide virtual machine instances and computing resources on a permanent or an as-needed basis.

The computing resources provided by the service provider network 114 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 114 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein will be described below with regard to FIG. 8.

The users and customers of the service provider network 114 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the customer computing devices 104, the software provider computing devices 102 may be utilized. It should also be appreciated that combinations of such networks might also be utilized.

Figure 8:
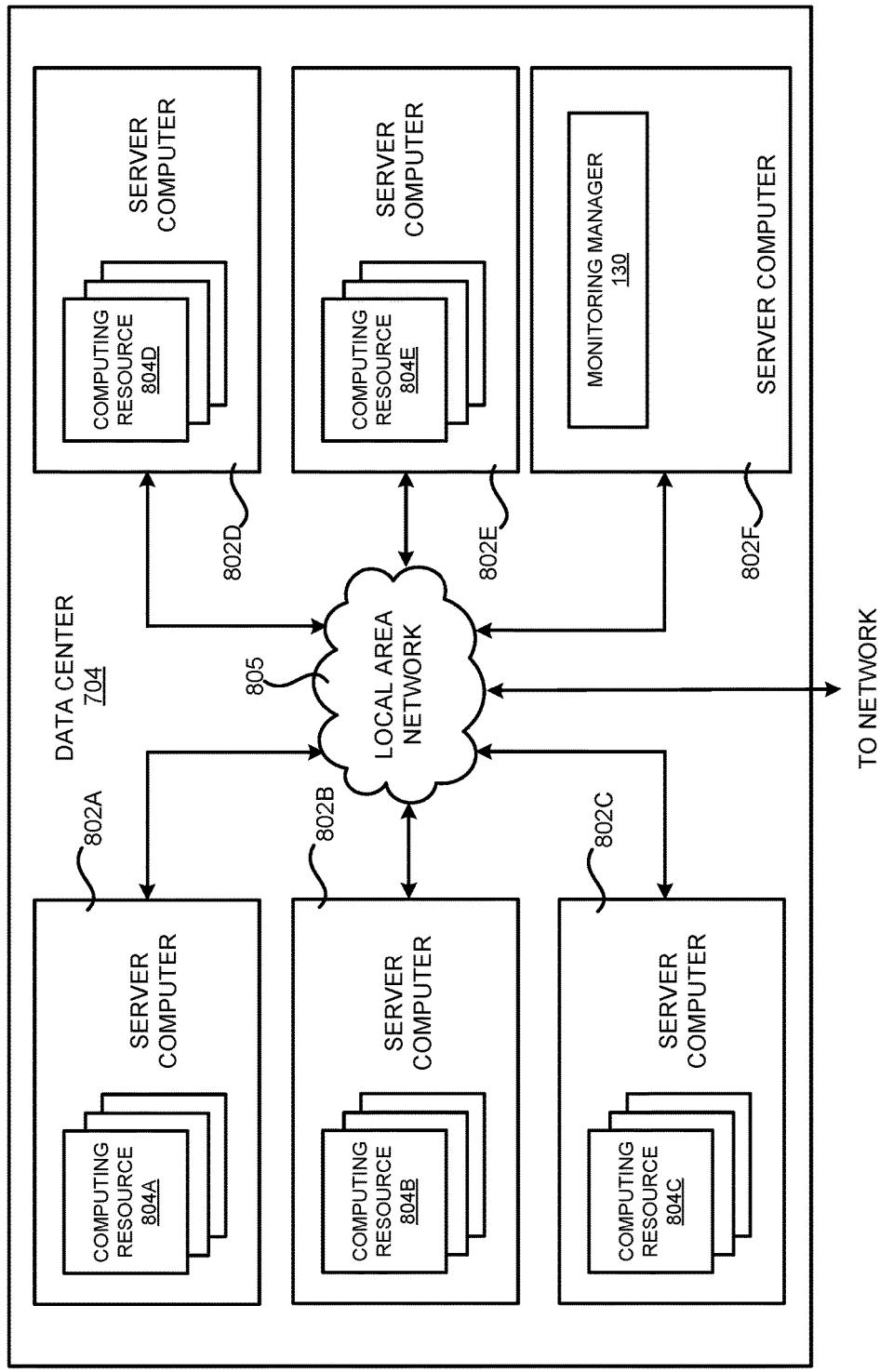
FIG. 8 is a computing system diagram that illustrates one configuration for a data center that implements aspects of a service provider network, including some or all of the concepts and technologies disclosed herein relating to identifying software products to test.

FIG. 8 is a computing system diagram that illustrates one configuration for a data center 704 that implements aspects of a service provider network 114, including some or all of the concepts and technologies disclosed herein for identifying software products 112 to test. The example data center 704 shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products 112 as described above.

In one example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the examples disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 704 shown in FIG. 8 also includes a server computer 802F reserved for executing software components for managing the operation of the data center 704, the server computers 802, virtual machine instances, and other resources within the service provider network 114. The server computer 802F might also execute the monitoring manager 130 as well as other components described herein. Details regarding the operation of each of these components has been provided above. In this regard, it should be appreciated that while these components are illustrated as executing within the service provider network 114, computing systems that are external to the service provider network 114 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the network 730 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 802A-802F in each data center 704 and between virtual machine instances and other types of computing resources provided by the service provider network 114.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
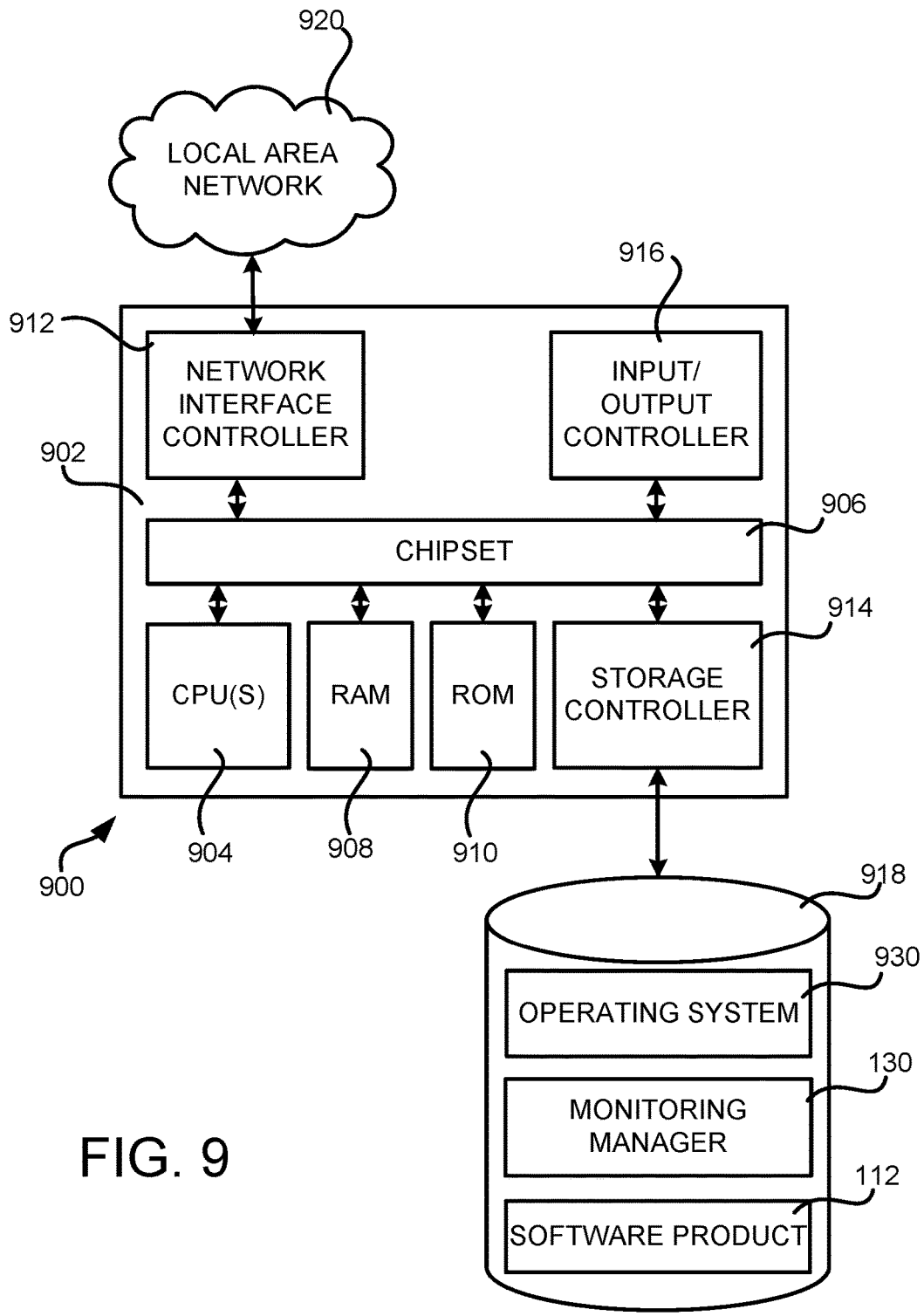
FIG. 9 is a computer architecture diagram showing one illustrative computer hardware architecture for implementing a computing device that might be utilized to implement aspects of the various examples presented herein.

FIG. 9 shows an example computer architecture for a computer 900 capable of executing program components for identifying software products 112 to test. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a customer computing device 104, a software provider computing device 102 or any other of the computing systems described herein.

The computer 900 includes a baseboard 902, or "motherboard," which is a printed circuit board to which a multitude of components or devices may be connected by way of a system bus or other electrical communication paths. In one illustrative example, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the examples described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 918 may store other system or application programs and data utilized by the computer 900, such as components that include the monitoring manager 130, the software product 112 and/or any of the other software components and data described above. The mass storage device 918 might also store other programs and data not specifically identified herein.

In one example, the mass storage device 918 or other computer-readable storage media is encoded with computer-executable instructions that, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various routines described above with regard to FIG. 5 and FIG. 6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for identifying software products 112 available from an electronic marketplace 108 to test have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A computer-implemented method for selecting a software product for testing, the method comprising:

identifying a software product available from an electronic marketplace, wherein the electronic marketplace has a plurality of software products;

obtaining, from one or more server computing devices of the electronic marketplace, first data that indicates a number of downloads of the software product within a specified period of time from the electronic marketplace;

generating, using the one or more server computing devices, a value indicating a forecasted popularity the software product based at least in part on the number of downloads, wherein the forecasted value indicates a popularity ranking of the software product relative to the plurality of the software products available from the electronic marketplace;

obtaining, from one or more customer computing devices, second data related to an execution of the software product, the data including one or more of crash data indicating one or more crashes of the software product, customer ratings data including one or more of positive customer reviews or negative customer reviews of the software product, software provider ratings data including one or more of positive software provider reviews or negative software provider reviews of one or more of the software product or other software products available from a software provider of the software product, marketplace data indicating revenue generated from acquisition of the software product from the electronic marketplace, or usage data indicating a time spent using the software product;

providing at least a portion of the second data to a machine learning mechanism, the second data including the crash data, the customer ratings data, the software provider ratings data, the marketplace data and the usage data, the machine learning mechanism utilizing random forests that operate using a plurality of decision trees;

receiving, from the machine learning mechanism, an indication that the software product exhibits anomalous behavior;

obtaining, from the one or more server computing devices of the electronic marketplace, updated first data that indicates a second number of downloads of the software product within a second specified period of time from the electronic marketplace;

adjusting the value based at least in part on the updated first data;

ranking the software product in relation to the plurality of software products available from the electronic marketplace based at least in part on the value indicating the forecasted popularity and the indication that the software product exhibits anomalous behavior;

determining that the software product has the highest value among the plurality of software products;

selecting the software product for testing; and causing the software product to be tested by a testing service.

2. The computer-implemented method of claim 1, wherein generating the value comprises:
determining a first average number of downloads within the specified period of time;
determining a second average number of downloads during a second specified period of time;
determining a trend based at least in part on the first average and the second average; and
adjusting the value based at least in part on the trend.

3. The computer-implemented method of claim 1, further comprising determining an average amount of time the software product was used within the specified period of time, determining revenue associated with the software product during the specified period of time and wherein generating the value indicating the forecasted popularity is based at least in part on the number of downloads, the average amount of time, and the revenue.

4. The computer-implemented method of claim 1, further comprising
determining a first number of positive customer reviews, a second number of negative customer reviews, and a third number of total customer reviews;
subtracting the second number of negative customer reviews from the first number of positive customer reviews to determine a fourth number;
dividing the fourth number by the third number to determine a normalized rating of the software product; and
adjusting the value indicating the forecasted popularity of the software product based at least in part on the normalized rating.

5. The computer-implemented method of claim 1, further comprising adjusting the value indicating the forecasted popularity of the software product downward in response to identifying a reduced usage of the software product from the specified period of time to a second period of time.

6. A system, comprising:
one or more computing devices configured to:
obtain data related to a software product available from an electronic marketplace, the data including download data indicating a number of downloads of the software product from the electronic marketplace within a first period of time and usage data indicating a time of use of the software product within the first period of time;
generate a predicted popularity score for the software product based at least in part on the data;
determine one or more of a risk score or a risk classification based, at least in part, on the data, wherein the one or more of the risk score of the risk classification indicates a risk of anomalous behavior of the software product;
obtain updated data related to the software product, the updated data including updated download data indicating a second number of downloads of the software product from the electronic marketplace within a second period of time and usage data indicating a time of use of the software product during the second period of time;
adjust one or more of the risk score or the risk classification based, at least in part, on the updated data; and
cause an action to be performed involving the software product based, at least in part, on the predicted popularity score and
the one or more of the risk score of the risk classification, the action selected from one or more actions including providing the software product to a testing service.

7. The system of claim 6, wherein the data further includes crash data indicating one or more crashes of the software product, customer ratings data including one or more of positive customer reviews or negative customer reviews of the software product, software provider ratings data including one or more of positive customer reviews of the software provider or negative customer software provider reviews of the software provider, or marketplace data indicating revenue generated from acquisition of the software product.

8. The system of claim 6, wherein to generate the predicted popularity score of the software product, the one or more computing devices are further configured to determine a first number of downloads of the software product within the first period of time, determine the second number of downloads of the software product within the second period of time, and predicting a third number of downloads for a third period of time.

9. The system of claim 6, wherein determine the risk classification is based at least in part on crash data indicating one or more crashes of the software product, customer ratings data including one or more of customer reviews of the software product, and software provider ratings data including one or more of customer reviews of a software provider that provides the software product.

10. The system of claim 6, wherein the one or more computing devices are configured to rank the software product in relation to at least a portion of other software products available from the electronic marketplace based at least in part on the predicted popularity score and the risk score.

11. The system of claim 10, wherein the one or more computing devices are configured to lower the score based at least in part on one or more of a number of uninstalls of the software product or a decreased usage of the software product in the second period of time compared to the use of the software product during the first period of time.

12. The system of claim 6, wherein to determine the risk score of anomalous behavior of the software product, the one or more computing devices are configured to access one or more of crash data indicating a crash of the software product, customer ratings data associated with customer reviews of the software product, software provider ratings data associated with customer reviews of a software provider of the software product, marketplace data indicating revenue generated by the software product, or usage data associated with a user of the software product.

13. The system of claim 6, wherein to generate the predicted popularity score, the one or more computing devices are configured to determine that a number of positive reviews of the software product is larger as compared to an average number of reviews received for software product and to increase the popularity score, based at least in part on the number of positive reviews.

14. The system of claim 6, wherein the one or more computing devices are configured to provide a user interface, the user interface including a first user element that when selected provides a ranking of at least a portion of the software products available from the electronic marketplace, wherein the software products are ranked using the popularity score.

15. The system of claim 6, wherein the electronic marketplace is associated with a service provider network and wherein one or more computing devices of the service provider network are configured to execute the software product on behalf of a customer of the electronic marketplace.

16. A computer-implemented method, comprising:
obtaining, from one or more server computing devices associated with an electronic marketplace, data related to a software product that is available from the electronic marketplace, the data indicating a number of downloads of the software product within a first period of time and a usage metric of the software product associated with use of the software product by a user of the electronic marketplace within the first period of time;
predicting, using the one or more server computing devices, a popularity score of the software product based at least in part on the data;
identifying, using the one or more server computing devices, a risk score indicating a risk that the software product exhibits anomalous behavior;
obtain updated data related to the software product, the updated data including updated download data indicating a second number of downloads of the software product from the electronic marketplace within a second period of time and
usage data indicating a time of use of the software product during the second period of time;
adjust one or more of the popularity score or the risk score based, at least in part, on the updated data;
determining, using the one or more server computing devices, to test the software product based at least in part on the popularity score of the software product and the risk score; and
provide, to one or more server computing devices associated with a testing service, an indication to test the software product.

17. The computer-implemented method of claim 16, wherein the data includes one or more of software product ratings data including customer reviews of the software product, software provider ratings data including customer reviews of the software provider of the software product.

18. The computer-implemented method of claim 16, further comprising determining, at a first time, that the software product is likely to exhibit anomalous behavior in a second time that is after the first time, and wherein determining to test the software product based at least in part on the popularity of the software product and the risk score is further based on the determination that the software product is likely to exhibit anomalous behavior in the second time.

19. The computer-implemented method of claim 18, further comprising generating a ranking score for the software product based at least in part on the popularity score and the risk score and ranking the software product based, at least in part, on the ranking score, wherein a higher ranked software product indicates a higher priority of testing as compared to a lower ranked software product.

20. The computer-implemented method of claim 16, wherein predicting the popularity of the software product comprises predicting a number of downloads of the software product for a period of time.

* * * * *